US008578504B2

(12) United States Patent
Brown et al.

(10) Patent No.: US 8,578,504 B2
(45) Date of Patent: Nov. 5, 2013

(54) SYSTEM AND METHOD FOR DATA LEAKAGE PREVENTION

(75) Inventors: Timothy G. Brown, Fort Edward, NY (US); Bilhar S. Mann, Southampton, NY (US)

(73) Assignee: CA, Inc., Islandia, NY (US)

( * ) Notice: Subject to any disclaimer, the term of this patent is extended or adjusted under 35 U.S.C. 154(b) by 629 days.

(21) Appl. No.: 12/575,120

(22) Filed: Oct. 7, 2009

(65) Prior Publication Data
US 2011/0083190 A1    Apr. 7, 2011

(51) Int. Cl.
*H04L 29/06* (2006.01)
(52) U.S. Cl.
USPC ............. 726/26; 726/2; 726/27; 726/28
(58) Field of Classification Search
USPC ................................................ 726/26
See application file for complete search history.

(56) References Cited

U.S. PATENT DOCUMENTS

| | | | |
|---|---|---|---|
| 6,408,306 B1 * | 6/2002 | Byrne et al. ........................ 1/1 |
| 6,781,607 B1 * | 8/2004 | Benham ..................... 715/744 |
| 7,333,956 B2 | 2/2008 | Malcolm | |
| 7,523,309 B1 | 4/2009 | Talbot et al. | |
| 8,001,594 B2 * | 8/2011 | Heintz et al. ................... 726/22 |
| 8,046,378 B1 * | 10/2011 | Zhuge et al. ................. 707/783 |
| 8,065,292 B2 * | 11/2011 | Yu ................................. 707/711 |
| 2005/0079912 A1 * | 4/2005 | Hanafusa ........................ 463/29 |
| 2005/0210135 A1 * | 9/2005 | Abrahams et al. ............ 709/225 |
| 2006/0277341 A1 * | 12/2006 | Johnson ........................ 710/200 |
| 2009/0300711 A1 * | 12/2009 | Tokutani et al. .................. 726/1 |

OTHER PUBLICATIONS

Samarati, P., & Sandhu, R. S. (Sep. 1994). Access Control: Principles and Practice. IEEE Communications Magazine, pp. 40-48.*
"EureKify Sage DNA Manual", User Manual Version 3.2, 243 pages, dated Sep. 2007.
"Orchestria Administrator Guide" Orchestria Active Policy Management Version 6.0, 370 pages, 2008.

* cited by examiner

*Primary Examiner* — Mohammad L Rahman
(74) *Attorney, Agent, or Firm* — Baker Botts, L.L.P.

(57) ABSTRACT

According to one embodiment, a method for securing information includes detecting an access to sensitive data and determining user information associated with the access to sensitive data. The method also includes determining a unique user identifier associated with the user information. In addition, the method includes comparing the access to sensitive data to a policy utilizing the unique user identifier. Further, the method includes determining that the access to sensitive data violates the policy in response to comparing the access to the policy. The method also includes recording an entry in response to determining that the access to sensitive data violates the policy.

18 Claims, 3 Drawing Sheets

SYSTEM AND METHOD FOR DATA LEAKAGE PREVENTION

TECHNICAL FIELD

This invention relates generally to data security and more particularly to a system and method for data leakage prevention.

BACKGROUND

Sensitive data is regulated and important to secure. With the increased level of connectivity available to users, sensitive data may be transmitted in violation of policies or legal regulations. The increased level of complexity in computing systems make the security of sensitive data much less manageable.

One solution to this problem has been to create policies associated with sensitive data and to monitor access to the sensitive data utilizing the policies. This approach has become susceptible to failure due to the increased usage of user identifiers. Users may use a variety of user identifiers (such as e-mail addresses, login names, etc.) to access sensitive data. It is very difficult to craft policies that capture all of the user identifiers that may be used in a system.

SUMMARY

According to one embodiment, a method for securing information includes detecting an access to sensitive data and determining user information associated with the access to sensitive data. The method also includes determining a unique user identifier associated with the user information. In addition, the method includes comparing the access to sensitive data to a policy utilizing the unique user identifier. Further, the method includes determining that the access to sensitive data violates the policy in response to comparing the access to the policy. The method also includes recording an entry in response to determining that the access to sensitive data violates the policy.

In some embodiments, the method may include sending the user information to a server and receiving the unique user identifier in response to sending the user information to the server. The method may also include utilizing a strength value of the association between the unique user identifier and the user information when comparing the access to sensitive data to the policy. Determining the unique user identifier associated with the user information may include determining if a stored version of a unique user identifier that corresponds to the user information exists. If the stored version does exist, the stored version of the unique user identifier may be retrieved. If the stored version does not exist, the unique user identifier may be requested from a server, wherein the request comprises the user information.

According to one embodiment, a system for data leakage prevention includes an agent and a subsystem. The agent is operable to detect an access to sensitive data and determine user information associated with the access to sensitive data. The subsystem is operable to determine a unique user identifier associated with the user information and compare the access to sensitive data to a policy utilizing the unique user identifier. The subsystem is also operable to determine that the access violates the policy in response to comparing the access to the policy and record an entry in response to determining that the access violates the policy.

Depending on the specific features implemented, particular embodiments may exhibit some, none, or all of the following technical advantages. In some embodiments, data leakage prevention policies may be applied to a user using a variety of identifiers. Maintaining policies governing the access to sensitive data may be facilitated in that the policies may not need to be updated every time a new user identifier is used for an existing user. Other technical advantages will be readily apparent to one skilled in the art from the following figures, description and claims.

DETAILED DESCRIPTION

Figure 1:
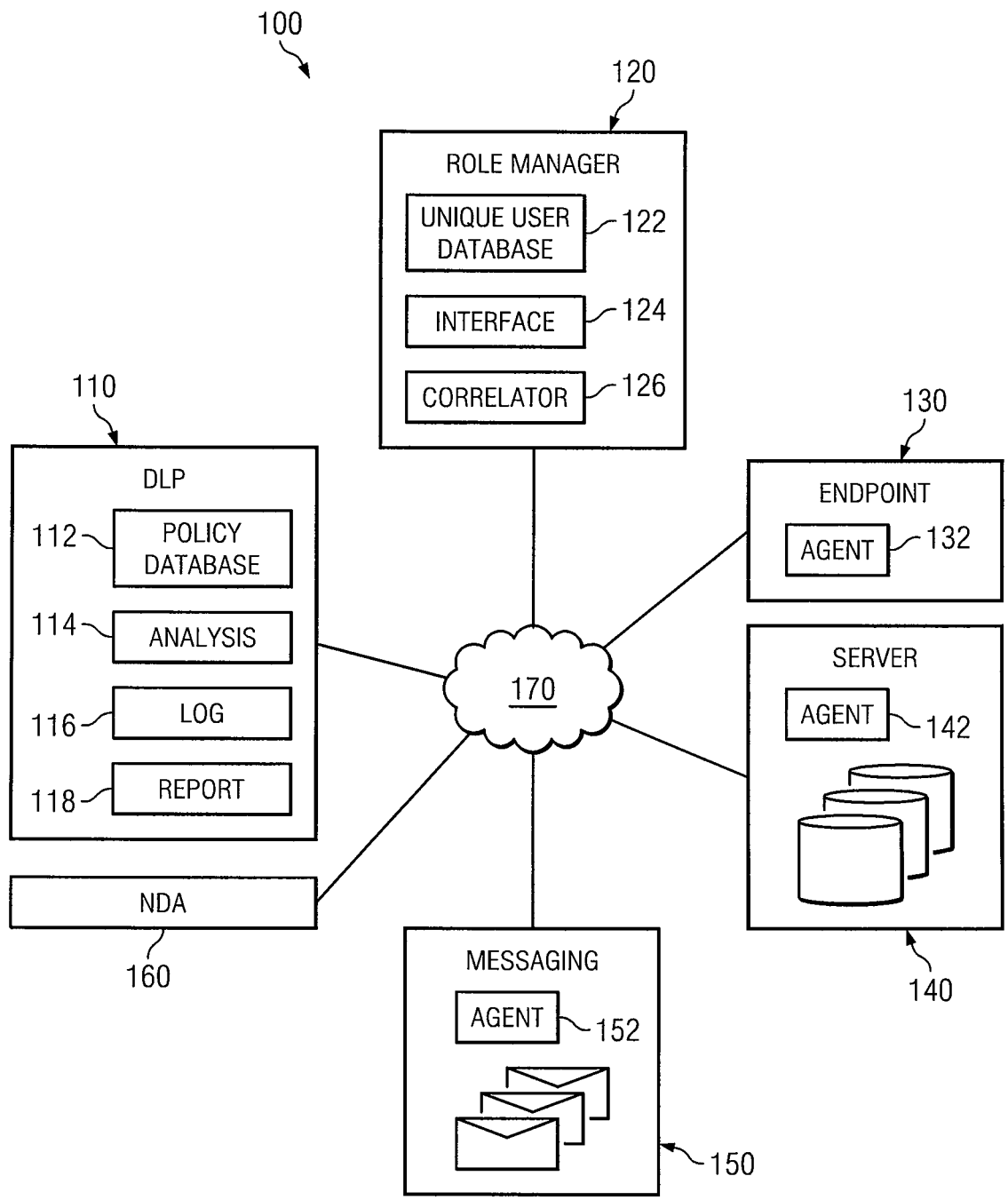
FIG. 1 illustrates one embodiment of a system for performing data leakage prevention.

FIG. 1 illustrates one embodiment of system 100 for performing data leakage prevention. System 100 includes Data Leakage Prevention (DLP) subsystem 110, role manager subsystem 120, endpoint 130, server 140, messaging subsystem 150, and Network Detection Agent (NDA) 160 all coupled to each other by network 170. DLP subsystem 110 includes policy database 112, analysis module 114, log module 116 and report module 118. Role manager subsystem 120 includes unique user database 122, interface 124, and correlator 126. Endpoint 130 includes agent 132. Server 140 includes agent 142. Messaging subsystem 150 includes agent 152.

Components 112, 114, 116, and 118 of DLP subsystem 110 may be implemented using software, hardware or a combination of the two. Components 112, 114, 116, 118 may, in some embodiments, be implemented on the same hardware as each other or different hardware. These components may also be implemented in virtualized environments. In addition, these components may be implemented using computing hardware coupled together in configurations such as clusters, Blade architectures, or suitable forms of distributed computing. Further details regarding the implementation of the components of DLP subsystem 110 are discussed below with respect to FIG. 2.

DLP subsystem 110, in some embodiments, may include various items in order to detect and/or prevent leakage of sensitive data. Policy database 112 may contain one or more policies that determine how sensitive data should be handled within system 100. Policies within policy database 112 may also include, in various embodiments, responses for situations where a leakage of sensitive data has been detected. Analysis module 114 may be configured to apply the policies to detect the activity within system 100. For example, analysis module 114 may receive information from agents 132, 142, 152 and/or 160 and apply one or more policies from policy database 112 by comparing the detected activity to the one or more policies. Log module 116 may maintain a history of activity reported by agents 132, 142, 152 and/or 160. Log module 116 may also record analysis performed by analysis module 114. For example, if analysis module 114 detects a violation of a policy stored in policy database 112, log module 116 may record the violation and information about the violation. Report module 118 may be configured to report events related to the activities of DLP subsystem 110. For example, if DLP subsystem 110 detects a violation of a policy within policy database 112, report module 118 may be configured to send a warning to an administrator.

Components 122, 124, and 126 of role manager subsystem 120 may be implemented in software, hardware or a combination of the two. These components may also be implemented in virtualized environments. In addition, these components may be implemented using computing hardware coupled together in configurations such as clusters, Blade architectures, or suitable forms of distributed computing. Further details regarding the implementation of the components of role manager subsystem 120 are discussed below with respect to FIG. 2.

Role manager subsystem 120 may be utilized to manage roles associated with users of system 100. In some embodiments, unique user database 122 may contain information relating unique user IDs (UUIDs) to various forms of identification of a user. For example, a user may have a variety of identifiers that the user uses when participating in system 100. Examples of such identifiers include e-mail addresses, login names, and other suitable identifiers. Unique user database 122 may correlate this information such that a UUID is properly associated with the appropriate identifiers of a user. Interface 124 may be used to send and receive information regarding UUIDs. For example, role manager 120 may receive requests for UUIDs through interface 124. Interface 124 may also be used to send information regarding UUIDs and other information about roles from role manager 120 to other entities. In some embodiments, correlator 126 may be utilized to create relationships between user identifiers and UUIDs. Correlator 126 may access unique user database 122 in performing such operations. For example, correlator 126 may receive an identifier access, unique user database 122 and determine a UUID associated with the received user identifier.

Agents 132, 142 and 152 may be implemented in software, hardware or a combination of the two. In some embodiments, agents 132, 142 and 152 may be software agents installed on endpoint 130, server 140 and messaging subsystem 150, respectively. They may also be implemented in virtualized environments. Further details regarding their implementation are discussed below with respect to FIG. 2.

Agents 132, 142 and 152 may, in some embodiments, analyze the handling of sensitive information by endpoint 130, server 140 and messaging system 150 respectively. Agents 132, 142, and 152 may be configured to report access to sensitive data to DLP subsystem 110. These agents, in some embodiments, may also report user information and/or context information associated with the access to sensitive data. Examples of this information include the user identifier associated with the access, the location of the access, the application used to access the sensitive data, the timing of the access, etc.

Endpoint 130, server 140 and messaging system 150 may be implemented in a suitable combination of software, hardware or both. Endpoint 130, server 140 and messaging system 150 may be implemented using software, hardware or a combination of the two. Endpoint 130, server 140 and messaging system 150 may, in some embodiments, be implemented on the same hardware as each other or different hardware. They may also be implemented in virtualized environments. In addition, in particular embodiments, they may be implemented using computing hardware coupled together in configurations such as clusters, Blade architectures, or suitable forms of distributed computing. Further details regarding the implementation of endpoint 130, server 140 and messaging system 150 are discussed below with respect to FIG. 2.

Endpoint 130, server 140, and messaging system 150 provide examples of the variety of contexts that system 100 supports for determining roles and monitoring access to sensitive data. Endpoint 130 may represent a variety of devices that may be used within system 100. For example, endpoint 130 may be a computer or a mobile device. Endpoint 130 may be used by users of system 100 as well as administrators and technicians. Mobile devices may include laptops, netbooks, mobile telephones, personal digitals assistants, and other suitable devices. Server 140 may provide a variety of services to system 100. Server 140 may provide services such as database services, storage services, gateway services, networking services, file services and other suitable services. Messaging system 150 may provide a variety of messaging services to system 100. For example, messaging system 150 may provide e-mail services, chat services, instant messaging services and other suitable messaging services. Messaging system 150 may store data regarding users applications and/or messages as part of providing such services.

NDA 160 may be implemented as a stand-alone unit within network 170 or may be a software or hardware module coupled to another entity on network 170. Such other entities may include endpoint 130, server 140 or messaging system 150. Network detection agent (NDA) 160 may examine transmissions occurring within network 170 and notify DLP subsystem 110 of activities related to sensitive data may also report user information and/or context information associated with the access to sensitive data. Examples of this information include the user identifier associated with the access, the location of the access, the application used to access the sensitive data, the timing of the access, etc.

Network 170, in some embodiments, is a communicative platform operable to exchange data or information. Network 170 could be a plain old telephone system (POTS). In various embodiments, network 170 could be any packet data network offering a communications interface or exchange between any two nodes in system 100. Network 170 may alternatively be any local area network (LAN), metropolitan area network (MAN), wide area network (WAN), wireless local area network (WLAN), virtual private network (VPN), intranet, Internet, or any other appropriate architecture or system that facilitates communications in a network or telephonic environment, including a combination of any networks or systems described above. Network 130 may also include wireless technology such as WiMAX, LTE, or any of a variety of cellular data networks.

In operation, in some embodiments, system 100 may be configured to prevent leakage of sensitive data by using UUIDs stored in unique user database 122. Agents 132, 142, 152 and 160 may report access to sensitive data to DLP subsystem 110. Analysis module 114 may determine one or more user identifiers associated with the access to sensitive data and communicate with role manager 120 using interface 124. Correlator 126 may, in response to the communication from analysis module 114, determine a UUID associated with the user identifier involved in the access to sensitive data and send, using interface 124, the UUID to analysis module 114. Analysis module 114 may use the received UUID to examine the access to sensitive data according to policies stored at policy database 112. Analysis module 114 may then determine if the access is valid or invalid and log module 116 may record that determination as well as, in some embodiments, the association between the UUID and the user identifier involved in the access to sensitive data. In some embodiments, this may allow for a more robust application of policies to activity involving sensitive data because users may be detected and properly analyzed although they may use varying user identifiers.

Figure 2:
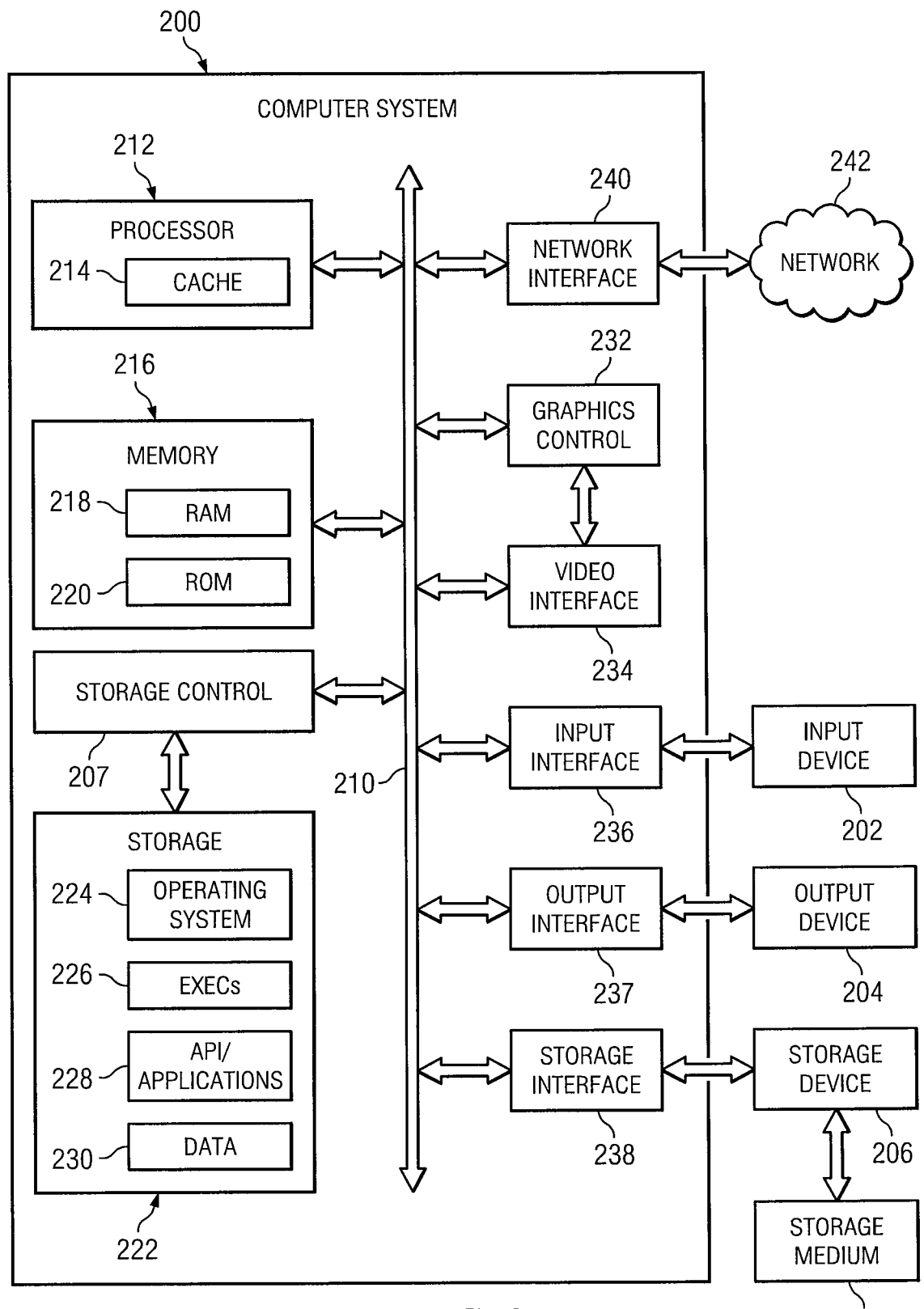
FIG. 2 illustrates an example computer system suitable for implementing one or more portions of particular embodiments.

FIG. 2 illustrates an example computer system 200 suitable for implementing one or more portions of particular embodiments. Although the present disclosure describes and illustrates a particular computer system 200 having particular components in a particular configuration, the present disclosure contemplates any suitable computer system having any suitable components in any suitable configuration. Moreover, computer system 200 may have take any suitable physical form, such as for example one or more integrated circuit (ICs), one or more printed circuit boards (PCBs), one or more handheld or other devices (such as mobile telephones or PDAs), one or more personal computers, or one or more super computers. Components discussed above with respect to FIG. 1 may be implemented using all of the components, or any appropriate combination of the components, of computer system 200 described below.

Computer system 200 may have one or more input devices 202 (which may include a keypad, keyboard, mouse, stylus, etc.), one or more output devices 204 (which may include one or more displays, one or more speakers, one or more printers, etc.), one or more storage devices 206, and one or more storage medium 208. An input device 202 may be external or internal to computer system 200. An output device 204 may be external or internal to computer system 200. A storage device 206 may be external or internal to computer system 200. A storage medium 208 may be external or internal to computer system 200.

System bus 210 couples subsystems of computer system 200 to each other. Herein, reference to a bus encompasses one or more digital signal lines serving a common function. The present disclosure contemplates any suitable system bus 210 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 200 includes one or more processors 212 (or central processing units (CPUs)). A processor 212 may contain a cache 214 for temporary local storage of instructions, data, or computer addresses. Processors 212 are coupled to one or more storage devices, including memory 216. Memory 216 may include random access memory (RAM) 218 and read-only memory (ROM) 220. Data and instructions may transfer bidirectionally between processors 212 and RAM 218. Data and instructions may transfer unidirectionally to processors 212 from ROM 220. RAM 218 and ROM 220 may include any suitable computer-readable storage media.

Computer system 200 includes fixed storage 222 coupled bi-directionally to processors 212. Fixed storage 222 may be coupled to processors 212 via storage control unit 207. Fixed storage 222 may provide additional data storage capacity and may include any suitable computer-readable storage media. Fixed storage 222 may store an operating system (OS) 224, one or more executables (EXECS) 226, one or more applications or programs 228, data 230 and the like. Fixed storage 222 is typically a secondary storage medium (such as a hard disk) that is slower than primary storage. In appropriate cases, the information stored by fixed storage 222 may be incorporated as virtual memory into memory 216.

Processors 212 may be coupled to a variety of interfaces, such as, for example, graphics control 232, video interface 234, input interface 236, output interface 237, and storage interface 238, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 240 may couple processors 212 to another computer system or to network 242. Network interface 240 may include wired, wireless, or any combination of wired and wireless components. Such components may include wired network cards, wireless network cards, radios, antennas, cables, or any other appropriate components. With network interface 240, processors 212 may receive or send information from or to network 242 in the course of performing steps of particular embodiments. Particular embodiments may execute solely on processors 212. Particular embodiments may execute on processors 212 and on one or more remote processors operating together.

In a network environment, where computer system 200 is connected to network 242, computer system 200 may communicate with other devices connected to network 242. Computer system 200 may communicate with network 242 via network interface 240. For example, computer system 200 may receive information (such as a request or a response from another device) from network 242 in the form of one or more incoming packets at network interface 240 and memory 216 may store the incoming packets for subsequent processing. Computer system 200 may send information (such as a request or a response to another device) to network 242 in the form of one or more outgoing packets from network interface 240, which memory 216 may store prior to being sent. Processors 212 may access an incoming or outgoing packet in memory 216 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 216 may include one or more computer-readable storage media embodying software and computer system 200 may provide particular functionality described or illustrated herein as a result of processors 212 executing the software. Memory 216 may store and processors 212 may execute the software. Memory 216 may read the software from the computer-readable storage media in mass storage device 216 embodying the software or from one or more other sources via network interface 240. When executing the software, processors 212 may perform one or more steps of one or more processes described or illustrated herein, which may include defining one or more data structures for storage in memory 216 and modifying one or more of the data structures as directed by one or more portions the software, according to particular needs. In addition or as an alternative, computer system 200 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In some embodiments, the described processing and memory elements (such as processors 212 and memory 216) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 3:
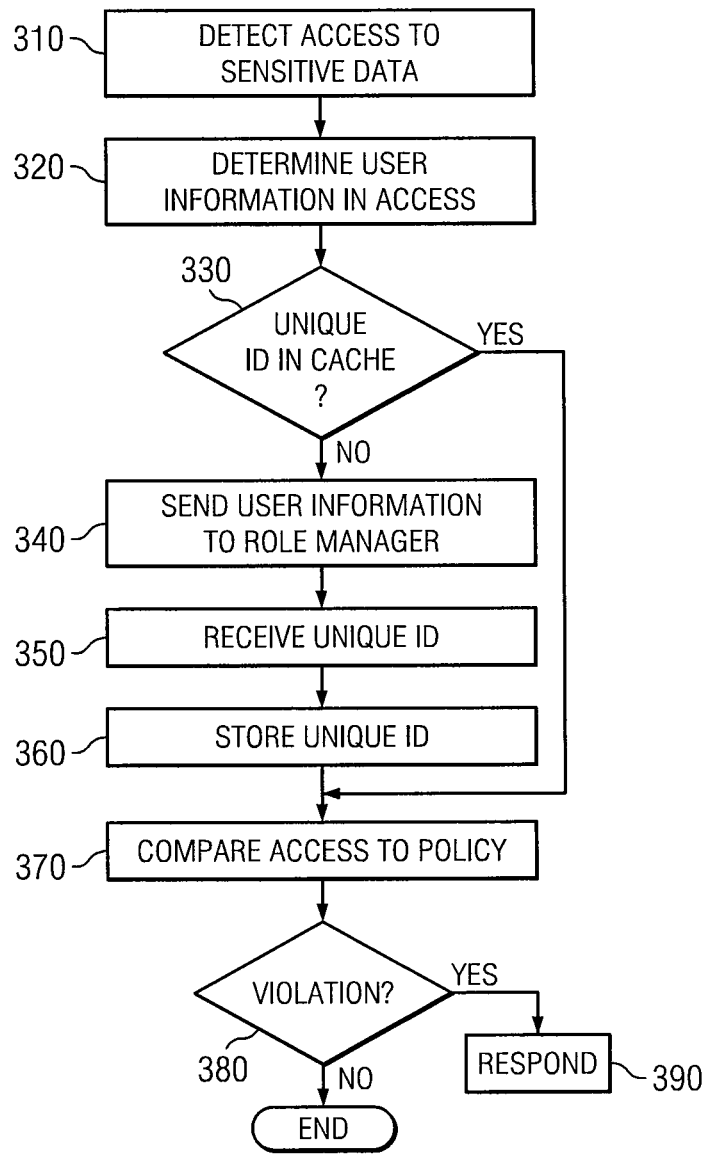
FIG. 3 is a flowchart illustrating one embodiment of analyzing an access to sensitive data using a unique user ID.

FIG. 3 is a flowchart illustrating one embodiment of analyzing an access to sensitive data using a unique user ID (UUID). In general, the steps illustrated in FIG. 3 may be combined, modified, or deleted where appropriate, and additional steps may also be added to the example operation. Furthermore, the described steps may be performed in any suitable order.

At step 310, in some embodiment, access to sensitive data may be detected. This may be accomplished using agents of a DLP system. The agents may reside on a variety of nodes on a network or may be a node in and of itself on a network. For example, suitable embodiments of agents include agents 132, 142, 152 and 160 of FIG. 1. At step 320, user information regarding the access to sensitive data may be determined. User information may be determined using the agents or by using a DLP subsystem such as, for example, DLP subsystem 110. Such information may include a user identifier, a user name or other forms of identification. User information may also include any groups or roles that the user is a part of, in various embodiments. In some embodiments, user information then may be determined at this step may include those who are part of the transaction regarding the sensitive data. For example, it could involve users who receive an e-mail with the sensitive data or users who have access to a folder that contains sensitive data. In some embodiments, user information may also include hardware profiles or other application or system identifiers that may be used to identify a user. Other suitable identifiers may be determined at this step.

At step 330, it may be determined whether a UUID exists in a cache. In some embodiments, UUIDs may be stored from previous analyses of accesses to sensitive data. In such a case, a UUID may be reused. In some embodiments, a UUID may be reused only during a certain time interval after the UUID has been stored. For example, it may be determined that reusing UUIDs should only occur for two weeks after the UUID has first been stored. In situations that occur after the time interval, the UUID in the cache will not be used and step 340 may be performed. If the UUID is in the cache, step 370 may be performed. In some embodiments, using UUIDs from the cache may allow the analysis of the access to sensitive data to occur faster.

At step 340, in some embodiments, the determined user information from step 320 may be sent to the role manager. In some embodiments, sending the information to the role manager may involve using a network. In particular embodiments, sending the user information may involve communicating within a computing system without using a network. For example, the role manager may reside on the same hardware or cluster of hardware as the entity performing the analysis on the access to sensitive data; in such cases, sending the user information may involve a computer bus or a computer terminal.

At step 350, a UUID may be received. The received UUID may correspond to the user information sent at step 340. The UUID may be received in response to a role manager determining the UUID from the user information. At step 360, the UUID may be stored. In various embodiments, a cache may be used to store the UUID. This may facilitate subsequent analyses of access to files involving the same or similar UUID. In some embodiments, the UUID received at step 350 may also include other identifiers associated with the UUID and these other identifiers may be stored at step 360. In some embodiments, this may allow for a faster processing of subsequent accesses to sensitive data by the same user but using different user identifiers.

At step 370, the access to the sensitive data may be compared to one or more policies. This comparison may be done, in various embodiments, using the UUID received at step 350. This may allow for policies to be applied more robustly since policies may correctly identify a user independent of which identifier the user chooses to use. Policies may be selected based on a variety of criteria including the UUID or the user identifier as well as the context for which the access to sensitive data was detected.

At step 380, it may be determined whether the access to sensitive data was in violation of one or more policies selected and analyzed at step 370. If there was no violation, then the method may conclude. If there was a violation, step 390 may be performed. In some embodiments, the violation may be determined based on the UUID instead of using the user identifier determined from the access to sensitive data. For example, if the access to sensitive data involved an e-mail message, the address of the recipient of the e-mail message may be correlated to a UUID at step 350. When determining if there is a violation according to the policy determined at step 370, the UUID may be used instead of the e-mail address because the e-mail address may not be a part of the policy.

At step 390, in some embodiments, a response may be performed due to the detection of a violation. This may include sending a message to various user identifiers associated with a UUID. This may include sending a message to one or more administrators regarding the access to sensitive data. User identifiers associated with the UUID may be used, in some embodiments, to perform other actions such as logging a user out of a system. For example, if a user used a personal e-mail address to send sensitive data, the e-mail address may be associated with a UUID at step 350. If the e-mail violated a policy, then, at step 390, other user identifiers associated with the user (such as a login name for an enterprise system that may be determined based on the UUID) may be prevented from using the login to access the enterprise system. Hence, in various embodiments, the UUID may be used not only to determine if there is a violation but also to produce sophisticated responses to determined violations.

Although several embodiments have been illustrated and described in detail, it will be recognized that modifications and substitutions are possible without departing from the spirit and scope of the appended claims.

What is claimed is:

1. A method for securing information, comprising:
    determining a first access to monitored data by a user, the first access comprising the user accessing a first portion of the monitored data;
    determining, after the user accessed the first portion of the monitored data, first user information associated with the user in response to determining the first access to the monitored data, the first access to the monitored data comprising the first user information;
    automatically determining, by a processor, a unique user identifier associated with the first user information in response to determining the first access to the monitored data;
    comparing, by the processor, a policy to the first access to the monitored data utilizing the unique user identifier in response to automatically determining the unique user identifier;
    determining, by the processor, that the first access to the monitored data violates the policy in response to comparing the first access to the monitored data to the policy;
    recording, by the processor, an entry in response to determining that the first access to the monitored data violates the policy;
    determining a second access to the monitored data by the user, the second access to the monitored data occurring after the first access to the monitored data, the second access comprising the user accessing a second portion the monitored data;
    determining, after the user accessed the second portion of the monitored data, second user information associated with the user in response to determining the second access to the monitored data, the second access to the monitored data comprising the second user information but not the first user information;
    automatically determining, by the processor, the unique user identifier in response to determining the second user information;
    comparing, by the processor, the second access to the monitored data to the policy utilizing the unique user identifier; and
    wherein comparing the first access to the monitored data to the policy comprises utilizing a strength value of the association between the unique user identifier and the first user information.

2. The method of claim 1, wherein determining the unique user identifier in response to determining the first access to the monitored data comprises:
    sending the first user information to a server; and
    receiving the unique user identifier in response to sending the first user information to the server.

3. The method of claim 1, wherein determining the unique user identifier in response to determining the first access to the monitored data comprises:
    determining if a stored version of the unique user identifier that corresponds to the first user information exists;
    if the stored version does exist, retrieving the stored version of the unique user identifier; and
    if the stored version does not exist, requesting the unique user identifier from a server, wherein the request comprises the first user information.

4. The method of claim 1, wherein the first user information comprises an e-mail address.

5. The method of claim 1, further comprising denying the first access to the monitored data in response to determining that the first access violates the policy.

6. The method of claim 1, wherein the first access to the monitored data comprises the presence of the monitored data in a message.

7. A computer program product comprising:
    a non-transitory computer readable storage medium comprising computer readable program code embodied therewith, the computer readable program code comprising:
        computer readable program code configured to determine a first access to monitored data by a user, the first access comprising the user accessing a first portion of the monitored data;
        computer readable program code configured to determine, after the user accessed the first portion of the monitored data, first user information associated with the first access to the monitored data;
        computer readable program code configured to determine a unique user identifier associated with the first user information in response to determining the first access to the monitored data;
        computer readable program code configured to compare a policy to the first access to the monitored data utilizing the unique user identifier in response to automatically determining the unique user identifier;
        computer readable program code configured to determine that the first access to the monitored data violates the policy in response to comparing the first access to the monitored data to the policy;
        computer readable program code configured to record an entry in response to determining that the first access to the monitored data violates the policy;
        computer readable program code configured to determine a second access to the monitored data by the user, the second access to the monitored data occurring after the first access to the monitored data, the second access comprising the user accessing a second portion the monitored data;
        computer readable program code configured to determine, after the user accessed the second portion of the monitored data, second user information associated with the user in response to determining the second access to the monitored data, the second access to monitored data comprising the second user information but not the first user information;
        computer readable program code configured to determine the unique user identifier in response to determining the second user information;
        computer readable program code configured to compare the second access to monitored data to the policy utilizing the unique user identifier; and
        wherein the computer readable program code configured to compare the access to sensitive data to the policy comprises computer readable program code configured to utilize a strength value of the association between the unique user identifier and the first user information.

8. The computer program product of claim 7, wherein the computer readable program code configured to determine a unique user identifier comprises:
   computer readable program code configured to send the first user information to a server; and
   computer readable program code configured to receive the unique user identifier in response to sending the first user information to the server.

9. The computer program product of claim 7, wherein the computer readable program code configured to determine the unique user identifier in response to determining the first access to the monitored data comprises:
   computer readable program code configured to determine if a stored version of the unique user identifier that corresponds to the first user information exists;
   computer readable program code configured to, if the stored version does exist, retrieve the stored version of the unique user identifier; and
   computer readable program code configured to, if the stored version does not exist, request the unique user identifier from a server, wherein the request comprises the first user information.

10. The computer program product of claim 7, wherein the first user information comprises an e-mail address.

11. The computer program product of claim 7, wherein the computer readable storage medium further comprises computer readable program code configured to deny access to the monitored data in response to determining that the first access violates the policy.

12. The computer program product of claim 7, wherein the first access to the monitored data comprises the presence of the monitored data in a message.

13. A system for data leakage prevention, comprising:
   a first agent present on a first node, the first node comprising a first hardware processor, the first agent operable to:
      detect a first access to monitored data by a user, the first access comprising the user accessing a first portion of the monitored data; and
      determine, after the user accessed the first portion of the monitored data, first user information associated with the first access to the monitored data;
   a second agent operable to:
      detect a second access to the monitored data by the user, the second access to the monitored data occurring after the first access to monitored data, the second access comprising the user accessing a second portion the monitored data; and
      determine, after the user accessed the second portion of the monitored data, second user information associated with the user in response to determining the second access to the monitored data, the second access to the monitored data comprising the second user information but not the first user information; and
   a second processor configured to:
      determine a unique user identifier associated with the first user information in response to the first agent determining the first user information;
      compare a policy to the first access to the monitored data utilizing the unique user identifier in response to determining the unique user identifier;
      determine that the first access to the monitored data violates the policy in response to comparing the first access to the monitored data to the policy;
      record an entry in response to determining that the first access to the monitored data violates the policy;
      determine the unique user identifier in response to the second agent determining the second user information;
      compare the second access to the monitored data to the policy utilizing the unique user identifier after determining the unique user identifier in response to the second agent determining the second user information; and
      wherein the second processor compares the first access to the monitored data to the policy by utilizing a strength value of the association between the unique user identifier and the first user information.

14. The system of claim 13, wherein the second processor determines the unique user identifier by:
   causing the first user information to be sent to a server; and
   receiving the unique user identifier in response to the first user information being sent to the server.

15. The system of claim 13, wherein the second processor determines the unique user identifier associated with the first user information by:
   determining if a stored version of the unique user identifier that corresponds to the first user information exists;
   if the stored version does exist, retrieving the stored version of the unique user identifier; and
   if the stored version does not exist, causing a request for the unique user identifier to be sent to a server, wherein the request comprises the first user information.

16. The system of claim 13, wherein the first user information comprises an e-mail address.

17. The system of claim 13, wherein the second processor is further configured to deny the first access to the monitored data in response to determining that the first access violates the policy.

18. The system of claim 13, wherein the first access to the monitored data comprises the presence of the monitored data in a message.

* * * * *